(12) United States Patent
Damnjanovic et al.

(10) Patent No.: US 8,670,376 B2
(45) Date of Patent: Mar. 11, 2014

(54) MULTI-CARRIER GRANT DESIGN

(75) Inventors: Jelena M. Damnjanovic, Del Mar, CA (US); Juan Montojo, San Diego, CA (US); Sandip Sarkar, San Diego, CA (US); Peter Gaal, San Diego, CA (US); Aamod D. Khandekar, San Diego, CA (US); Amir Farajidana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 938 days.

(21) Appl. No.: 12/536,733

(22) Filed: Aug. 6, 2009

(65) Prior Publication Data

US 2010/0040004 A1 Feb. 18, 2010

Related U.S. Application Data

(60) Provisional application No. 61/088,319, filed on Aug. 12, 2008, provisional application No. 61/113,443, filed on Nov. 11, 2008, provisional application No. 61/143,146, filed on Jan. 7, 2009, provisional application No. 61/112,029, filed on Nov. 6, 2008.

(51) Int. Cl.
*H04W 4/00* (2009.01)

(52) U.S. Cl.
USPC .......................................... 370/328; 370/329

(58) Field of Classification Search
USPC ......... 370/328, 329, 331, 335, 337, 344, 347, 370/438; 455/416, 422.1, 423, 434, 436, 455/442, 450, 451, 452.1, 452.2, 454, 458, 455/522
See application file for complete search history.

(56) References Cited

FOREIGN PATENT DOCUMENTS

| RU | 2006123443 A | 1/2008 |
| WO | 03034642 A2 | 4/2003 |
| WO | WO2006029313 A1 | 3/2006 |
| WO | WO2006125149 A2 | 11/2006 |
| WO | 2007035047 A2 | 3/2007 |
| WO | 2007149961 | 12/2007 |

OTHER PUBLICATIONS

3rd Generation Partnership Project; Technical Specification Group Radio Access Network; Dual-Cell HSDPA operation; (Release 8) 3GPP Standard; 3GPP TR 25.825, 3rd Generation Partnership Project (3GPP), Mobile Competence Centre ; 650, Route Des Lucioles ; F.

Ericsson, "Carrier aggregation in LTE-Advanced", 3GPP Draft, R1-082468, 3rd Generation Partnership Project (3GPP), Mobile Competence Centre, 650, Route Des Lucioles, F-06921 Sophia-Antipolis Cedex, France, vol. RAN WGI, No. Warsaw, Poland, 20080624, Jun. 24, 2008, XP050110739.

(Continued)

*Primary Examiner* — Kwang B Yao
*Assistant Examiner* — Adam Duda
(74) *Attorney, Agent, or Firm* — Paul Kuo

(57) ABSTRACT

Systems and methodologies are described that facilitate assigning resources for an anchor carrier and an additional carrier with a grant message. The grant message communicated with an anchor carrier can include resource information a plurality of carriers. Moreover, the systems and methodologies that facilitate identifying control information for an anchor carrier and/or an additional carrier based upon an operating mode, wherein the operating mode is a legacy mode or an extended mode. Based on the operating mode, particular resources associated with control regions are monitored for control information for respective anchor carrier(s) or additional carrier(s).

32 Claims, 18 Drawing Sheets

(56) References Cited

OTHER PUBLICATIONS

Heejung Yu et al., "Design of Dual-Band MIMO-OFDM System for Next Generation Wireless LAN", Communications, 2005, ICC 2005, 2005 IEEE International Conference on Seoul, Korea May 16-20, 2005, Piscataway, NJ, USA.IEEE, vol. 4, May 16, 2005, pp. 2640-2644, XP010825665.
International Search Report and Written Opinion—PCT/US2009/053568, International Search Authority—European Patent Office—Jan. 31, 2011.
Ericsson et al: "Text Proposal for DC-HSDPA assumptions and standards impact" 3GPP Draft; R1-082249 Text Proposal for DC-HSDA Assumptions and Standards Impact, 3rd Generation Partnership Project (3GPP), Mobile Competence Centre; 650, Route Des Lucioles; F-06921 Sophia-Antipolis Cedex; France, vol. RAN WGI, No. Kansas City, USA; 20080523, May 23, 2008, XP050110541, p. 8, paragraph 4.1-paragraph 4.2; p. 9, paragraph 4.3.1.
Nokia: "DL control signaling encoding" 3GPP Draft; R1-061913 TR25814CR002, 3rd Generation Partnership Project (3GPP), Mobile Competence Centre ; 650, Route Des Lucioles ; F-06921 Sophia-Antipolis Cedex ; France, vol . RAN WG1, No. Cannes, France; 20060620.
Partial International Search Report—PCT/US2009/053568, International Searching Authority—European Patent Office, Sep. 30, 2010.
Samsung: "Downlink Control Signaling" , 3GPP Draft; RI-060811 DL Control Signaling, 3rd Generation Partnership Project (3GPP), Mobile Competence Centre ; 650, Route Des Lucioles ; F-06921 Sophia-Antipolis Cedex ; France, vol. RAN WG1, No. Athens, Greece;.
"3rd Generation Partnership Project; Technical Specification Group Radio Access Network; Evolved Universal Terrestrial Radio Access (E-UTRA); Multiplexing and channel coding (Release 8)" 3GPP Standard; 3GPP TS 36.212, 3rd Generation Partnership Project (3GPP), Mobile Competence Centre; 650, Route Des Lucioles ; F-06921 Sophia-Antipolis Cedex France, No. V8.3.0, May 1, 2008, pp. 1-48, XP050377549, p. 33.
European Search Report—EP11167776—Search Authority—Hague—Aug. 28, 2012.
Qualcomm Europe, "DC-HSDPA and CPC", 3GPP Draft, R2-083394, 3rd Generation Partnership Project (3GPP), Mobile Competence Centre, 650, Route Des Lucioles, F-06921 Sophia-Antipolis Cedex, France, vol. RAN WG2, No. Warsaw, Poland, 20080624, Jun. 24, 2008, XP050140788.
Qualcomm Europe: "Dual Carrier operation for CELL_DCH", 3GPP Draft; R1-081438, 3rd Generation Partnership Project (3GPP), Mobile Competence Centre ; 650, Route Des Lucioles ; F-06921 Sophia-Antipolis Cedex ; France, vol. RAN WGI, No. Shenzhen, China; 20080326, Mar. 26, 2008, XP050109855, [retrieved on Mar. 26, 2008] chapter: 2.3.
Taiwan Search Report—TW098127177—TIPO—Jan. 15, 2013.
3rd Generation Partnership Project; Technical Specification Group Radio Access Network; Evolved Universal Terrestrial Radio Access (E-UTRA); Physical layer procedures (Release 8), 3GPP TS 36.211 V8.3.0, May 2008.

MULTI-CARRIER GRANT DESIGN

CROSS-REFERENCE TO RELATED APPLICATIONS

This application claims the benefit of U.S. Provisional Patent Application Ser. No. 61/088,319 entitled "MULTI-CARRIER DESIGN FOR LTE-A-UL GRANTS" which was filed Aug. 12, 2008. The entirety of the aforementioned application is herein incorporated by reference. This application claims the benefit of U.S. Provisional Patent Application Ser. No. 61/113,443 entitled "DCI DESIGN FOR MULTI CARRIER SYSTEM" filed on Nov. 11, 2008, U.S. Provisional Patent Application Ser. No. 61/143,146 entitled "DCI DESIGN FOR MULTI CARRIER SYSTEM" filed on Jan. 7, 2009, and U.S. Provisional Patent Application Ser. No. 61/112,029 entitled "COMMON HARO PROCESS ID FOR MULTI-CARRIER OPERATION" filed on Nov. 6, 2008.

BACKGROUND

I. Field

The following description relates generally to wireless communications, and more particularly to uplink (UL) grants for multiple carriers.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Area tracking within a wireless communication system enables a tracking area location for user equipment (e.g., mobile device, mobile communication apparatus, cellular device, smartphone, etc.) to be defined. Typically, a network can request or page the user equipment (UE) in which the UE can respond with such tracking area location. This enables the tracking area location of the UE to be communicated and updated to the network.

Multi-carrier systems often employ cross-carrier operations which provide good system performance. In a multiple carrier system or environment, a user equipment can leverage multiple carriers (e.g., a carrier can include an amount of resources or a collection of resources, an amount of bandwidth, etc.). Within multi-carrier operation, an anchor carrier can be utilized to communicate information related to two or more carriers. Moreover, control information being absent can prevent data transmissions on these carriers. In other words, multi-carrier systems cannot distinguish for which carrier received control is applicable. In addition, within a multiple carrier system or environment, uplink (UL) and downlink (DL) control assignments can be costly in overhead and user equipment (UE) assignment monitoring for each carrier.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates assigning resources within a multiple carrier environment. The method can include identifying a plurality of carriers in frequency and at least one anchor carrier among the plurality of carriers. Further, the method can include identifying respective relationships between respective anchor carriers and sets of carriers corresponding to the respective anchor carriers. Moreover, the method can comprise receiving at least one grant message on one or more anchor carriers. The method can additionally include determining a set of assigned resources on respective sets of carriers corresponding to the one or more anchor carriers on which the at least one grant message was received based at least in part on the at least one grant message.

Another aspect relates to a wireless communications apparatus. The wireless communications apparatus can include at least one processor configured to identify a plurality of carriers in frequency and at least one anchor carrier among the plurality of carriers, identify respective relationships between respective anchor carriers and sets of carriers corresponding to the respective anchor carriers, receive at least one grant message on one or more anchor carriers, and determine a set of assigned resources on respective sets of carriers corresponding to the one or more anchor carriers on which the at least one grant message was received based at least in part on the at least one grant message. Further, the wireless communications apparatus can include memory coupled to the at least one processor.

Yet another aspect relates to a wireless communications apparatus that enables assignment of resources within a multiple carrier environment. The wireless communications apparatus can include means for identifying a plurality of carriers in frequency and at least one anchor carrier among the plurality of carriers. Additionally, the wireless communications apparatus can comprise means for identifying respective relationships between respective anchor carriers and sets of carriers corresponding to the respective anchor carriers. Further, the wireless communications apparatus can comprise means for receiving at least one grant message on one or more anchor carriers. Moreover, the wireless communications apparatus can comprise means for determining a set of assigned resources on respective sets of carriers corresponding to the one or more anchor carriers on which the at least one grant message was received based at least in part on the at least one grant message.

Still another aspect relates to a computer program product comprising a computer-readable medium having stored thereon code causing at least one computer to identify a plurality of carriers in frequency and at least one anchor carrier among the plurality of carriers, identify respective relationships between respective anchor carriers and sets of carriers corresponding to the respective anchor carriers, receive at least one grant message on one or more anchor carriers, and determine a set of assigned resources on respective sets of carriers corresponding to the one or more anchor carriers on which the at least one grant message was received based at least in part on the at least one grant message.

According to other aspects, a method that facilitates identifying control transmissions based upon an operating mode. The method can comprise identifying an employed operating mode, wherein the employed operating mode is selected from the group consisting of a legacy mode and an extended mode. Further, the method can comprise upon identifying the legacy mode, monitoring for control transmissions on resources associated with at least one control region of an anchor carrier within an associated system bandwidth. Moreover, the method can include upon identifying the extended mode, monitoring for control transmissions on resources associated with the at least one control region of the anchor carrier and at least one control region of one or more additional carriers within the associated system bandwidth.

Another aspect relates to a wireless communications apparatus. The wireless communications apparatus can include at least one processor configured to identify an employed operating mode, wherein the employed operating mode is selected from the group consisting of a legacy mode and an extended mode, upon identify the legacy mode, monitoring for control transmissions on resources associated with at least one control region of an anchor carrier within an associated system bandwidth, and upon identify the extended mode, monitoring for control transmissions on resources associated with the at least one control region of the anchor carrier and at least one control region of one or more additional carriers within the associated system bandwidth. Further, the wireless communications apparatus can include memory coupled to the at least one processor.

Another aspect relates to a wireless communications apparatus that identifies control transmissions based upon an operating mode. The wireless communications apparatus can comprise means for identifying an employed operating mode, wherein the employed operating mode is selected from the group consisting of a legacy mode and an extended mode. Moreover, the wireless communications apparatus can comprise means for upon identifying the legacy mode, monitoring for control transmissions on resources associated with at least one control region of an anchor carrier within an associated system bandwidth. Further, the wireless communications apparatus can include means for upon identifying the extended mode, monitoring for control transmissions on resources associated with the at least one control region of the anchor carrier and at least one control region of one or more additional carriers within the associated system bandwidth.

Still another aspect relates to a computer program product comprising a computer-readable medium having stored thereon code for causing at least one computer to identify an employed operating mode, wherein the employed operating mode is selected from the group consisting of a legacy mode and an extended mode, upon identify the legacy mode, monitoring for control transmissions on resources associated with at least one control region of an anchor carrier within an associated system bandwidth, and upon identify the extended mode, monitoring for control transmissions on resources associated with the at least one control region of the anchor carrier and at least one control region of one or more additional carriers within the associated system bandwidth.

According to other aspects, a method that facilitates communicating control information for two or more carriers to a user equipment (UE). The method can comprise configuring an anchor carrier at a predetermined frequency range within a system bandwidth to include a control region detectable to respective user equipment units (UEs) operating in a legacy mode and respective UEs operating in an extended mode. Further, the method can comprise configuring at least one additional carrier at respective non-overlapping frequency ranges within the system bandwidth to include respective control regions detectable to UEs operating in the extended mode but transparent to UEs operating in the legacy mode.

Another aspect relates to a wireless communications apparatus. The wireless communications apparatus can include at least one processor configured to configure an anchor carrier at a predetermined frequency range within a system bandwidth to include a control region detectable to respective user equipment units (UEs) operating in a legacy mode and respective UEs operating in an extended mode, and configure at least one additional carrier at respective non-overlapping frequency ranges within the system bandwidth to include respective control regions detectable to UEs operating in the extended mode but transparent to UEs operating in the legacy mode. Further, the wireless communications apparatus can include memory coupled to the at least one processor.

Another aspect relates to a wireless communications apparatus that communicates control information. The wireless communications apparatus can comprise means for configuring an anchor carrier at a predetermined frequency range within a system bandwidth to include a control region detectable to respective user equipment units (UEs) operating in a legacy mode and respective UEs operating in an extended mode. Moreover, the wireless communications apparatus can comprise means for configuring at least one additional carrier at respective non-overlapping frequency ranges within the system bandwidth to include respective control regions detectable to UEs operating in the extended mode but transparent to UEs operating in the legacy mode.

Still another aspect relates to a computer program product comprising a computer-readable medium having stored thereon code for causing at least one computer to configure an anchor carrier at a predetermined frequency range within a system bandwidth to include a control region detectable to respective user equipment units (UEs) operating in a legacy mode and respective UEs operating in an extended mode, and configure at least one additional carrier at respective non-overlapping frequency ranges within the system bandwidth to include respective control regions detectable to UEs operating in the extended mode but transparent to UEs operating in the legacy mode.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
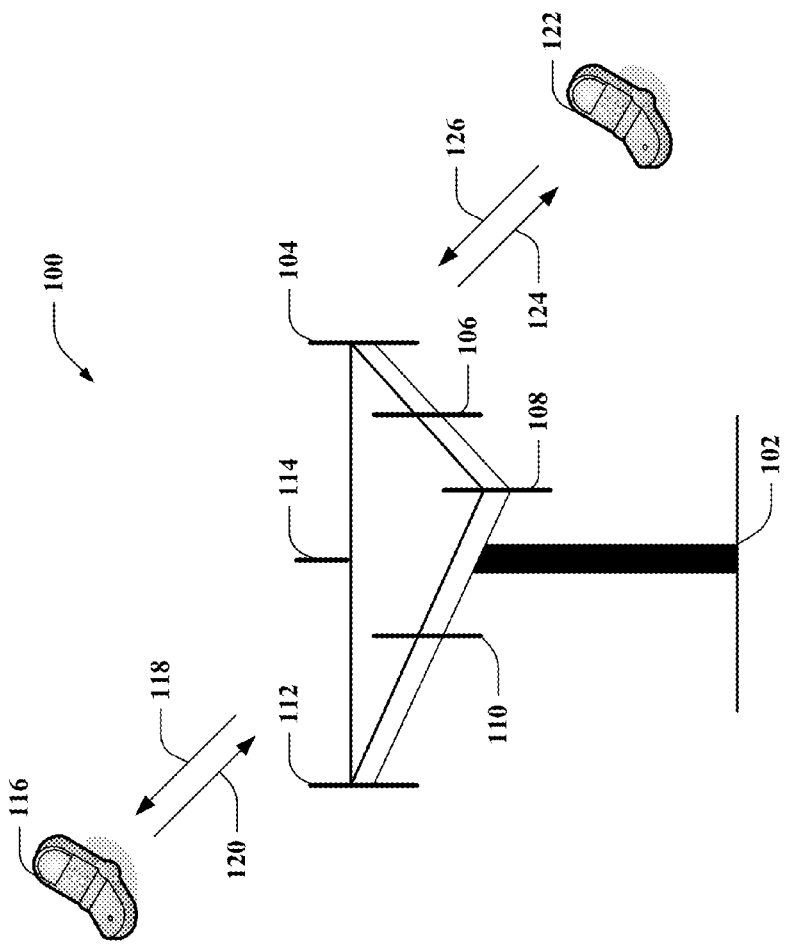
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "carrier," "source," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, ... ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can provide the assignment of resources associated with a plurality of carriers based upon a received grant message from an anchor carrier. In other words, an anchor carrier can communicate a grant message, wherein the grant message can include resource assignments for a plurality of carriers (e.g., anchor carrier, additional carriers, etc.). In an example, the grant message can be carrier specific in which the grant message is independently coded for each carrier. In another example, the grant message can be jointly coded in which resource information is common for the specified carriers.

Moreover, the subject innovation can enable efficient identification of control information for a user equipment (UE). For example, an operating mode can be identified in which the operating mode can be a legacy mode or an extended mode. Based upon the identified operating mode, the control information can be monitored at a particular control region within an anchor carrier bandwidth. In other words, control information for a user equipment (UE) can be identified within particular control regions based upon whether in legacy mode or extended mode.

Figure 2:
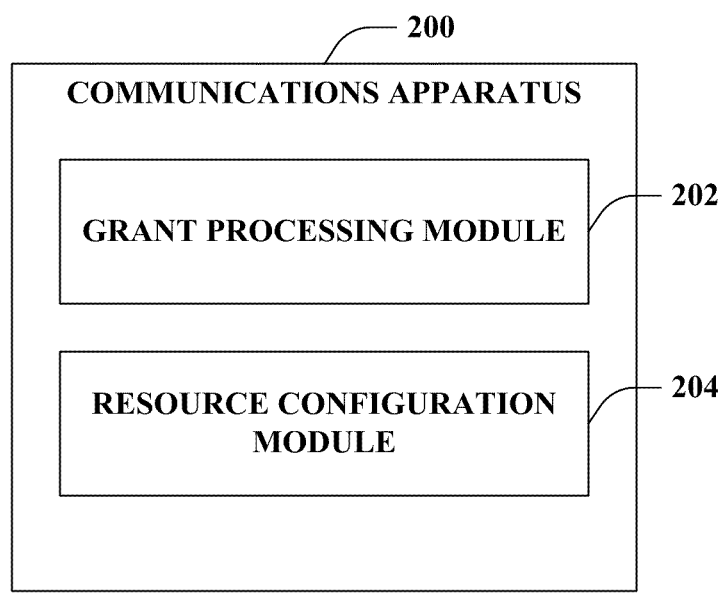
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to facilitate identifying control information and assigning resources for a plurality of carriers.

The communications apparatus 200 can include a grant processing module 202 and/or a resource configuration module 204. The grant processing module 202 can receive a grant message from an anchor carrier that includes resource assignment for two or more carriers. The resource configuration module 204 can manage settings and configurations of resources for the two or more carriers based at least in part upon the received grant message.

Moreover, the communications apparatus 200 can further enable employment and identification of operating modes in which control information can be monitored at various regions based upon the particular operating mode. For example, control transmission on resources associated with a control region for an anchor carrier can be monitored if a first operating mode is identified. Moreover, control transmissions on resources associated with a control region for an anchor carrier and a control region for an additional carrier can be monitored if a second operating mode is identified.

Moreover, although not shown, it is to be appreciated that communications apparatus 200 can include memory that retains instructions with respect to identifying a plurality of carriers in frequency and at least one anchor carrier among the plurality of carriers, identifying respective relationships between respective anchor carriers and sets of carriers corresponding to the respective anchor carriers, receiving at least one grant message on one or more anchor carriers, determining a set of assigned resources on respective sets of carriers corresponding to the one or more anchor carriers on which the at least one grant message was received based at least in part on the at least one grant message, and the like. Further, communications apparatus 200 can include a processor that may be utilized in connection with executing instructions (e.g., instructions retained within memory, instructions obtained from a disparate source, . . . ).

Additionally, although not shown, it is to be appreciated that communications apparatus 200 can include memory that retains instructions with respect to identifying an employed operating mode, wherein the employed operating mode is selected from the group consisting of a legacy mode and an extended mode, upon identifying the legacy mode, monitoring for control transmissions on resources associated with at least one control region of an anchor carrier within an associated system bandwidth, upon identifying the extended mode, monitoring for control transmissions on resources associated with the at least one control region of the anchor carrier and at least one control region of one or more additional carriers within the associated system bandwidth, and the like. Further, communications apparatus 200 can include a processor that may be utilized in connection with executing instructions (e.g., instructions retained within memory, instructions obtained from a disparate source, . . . ).

Figure 3:
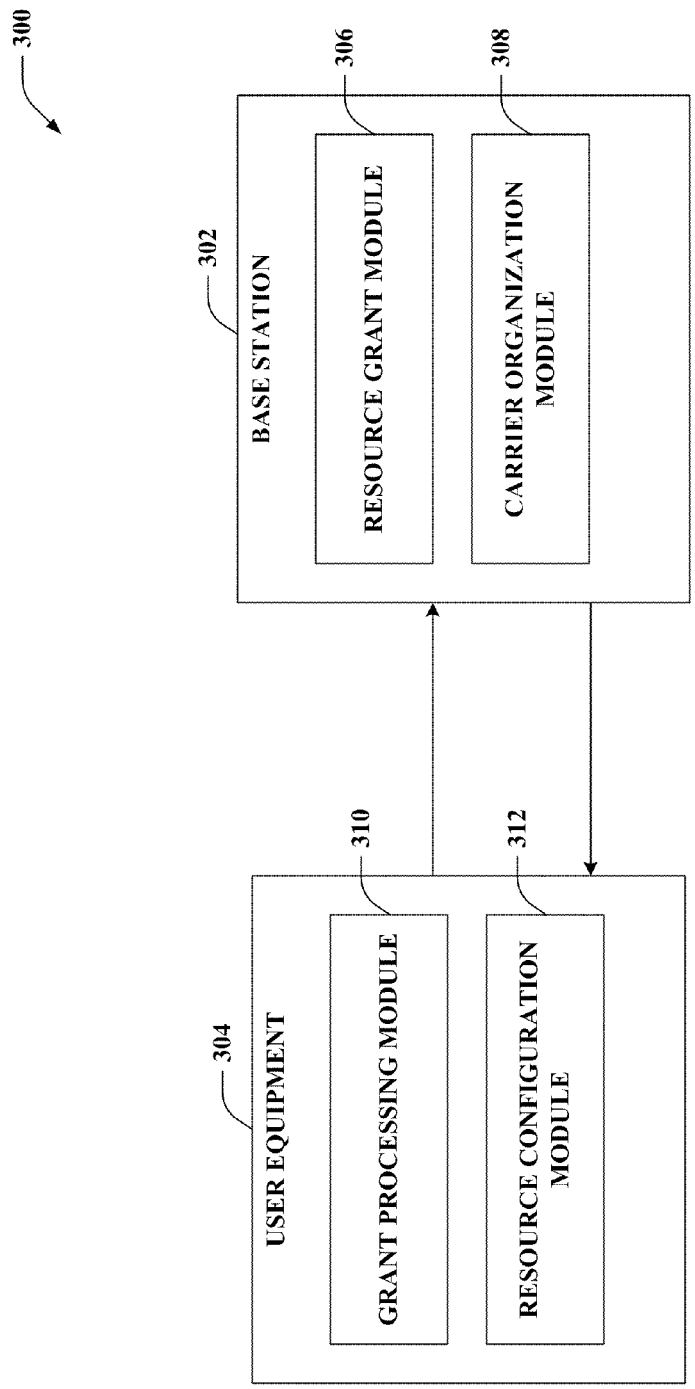
FIG. 3 is an illustration of an example wireless communications system that facilitates assigning resources for a plurality of carriers.

Now referring to FIG. 3, illustrated is a wireless communications system 300 that can provide assignment of resources for a plurality of carriers. The system 300 includes a base station 302 that communicates with a user equipment 304 (and/or any number of disparate user equipment (not shown)). Base station 302 can transmit information to user equipment 304 over a forward link channel; further base station 302 can receive information from user equipment 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the user equipment 304 as well and vice versa, in one example; the configuration depicted excludes these components for ease of explanation.

Base station 302 includes a resource grant module 306. The resource grant module 306 can create a grant message that indicates recourse assignment for at least one anchor carrier and/or at least one additional carrier. The base station 302 can further include a carrier organization module 308. The carrier organization module 308 can aggregate resource information from at least one anchor carrier and/or at least one additional carrier in order to create a grant message to indicate resource assignment.

User equipment 304 can include a grant processing module 310 that evaluate the received grant message in order to identify resource allocation for at least one anchor carrier and/or at least one additional carrier. The user equipment 304 can further include a resource configuration module 312 that can configure the user equipment 304 based at least in part upon the grant message and indicated resource assignments for the at least one anchor carrier and/or the at least one additional carrier.

In regards to uplink (UL) control, the legacy control region can be retained on an anchor carrier. For example, the legacy control region can be on the edges of the legacy segment and can be used for control of the legacy UEs and for Rel-9/10 UEs. In addition, a new control region can be implemented. The new control region can be used for control of the Rel-9/10 UEs. The exact frequency location can be defined in an additional SIB. For example, the location can be on the anchor carrier within the legacy data part and/or on the new, non-legacy carriers. This can enable diversity and protection based upon frequency diverse RBs and hopping and frequency coordination to protect the band.

In regards to uplink (UL) grant, a legacy UE can receive a UL grant on the anchor carrier and assign resources on the UL carrier paired with the anchor carrier. In Rel-9/10 UE, the UL grant on the anchor carrier can assign UL resources on the UL carriers for which it is defined as an anchor carrier. For example, UL carriers paired with the DL carriers for which it is defined as an anchor carrier. UL assignments across multiple UL carriers can assume joint or independent data coding. This can be conveyed to the UE in the grant message. Joint coding can be possible for OFDMA based ULs or multi-PA UEs with SC-FDM based ULs. This can be considered a new grant format.

Moreover, it is to be appreciated that the UL grants on a DL carrier that is not an anchor carrier can assign resources for the UL carrier paired with it as well as for legacy UEs. Additionally, grants across carriers can be concatenated to convey the aggregate assignment.

In regards to a multicarrier DL DCI format, DL grant overhead in a multicarrier system can be different depending on how HARQ and MCS information for each carrier are conveyed to a UE. Single multicarrier grant can have additional bits for separate MCS for each carrier (e.g., 5 bits per carrier). Multiple Rel-8 based grant sent on each carrier separately can have additional bits for MCS, flags, HARQ process ID, CRC per carrier (e.g., 25 bits per carrier). Thus, an MC grant format is desirable. Common fields such as CRC, HARQ process ID, and flags can be saved from repeating as can happen with separate grant per carrier.

In regards to HARQ operation, if separate, per carrier Rel-8 grant is used, separate HARQ process can be defined per carrier. If multicarrier grant is used, common HARQ process can be used across all carriers. This can be an extension of the MIMO multiple code words design and can be applicable to MIMO and SIMO case. A new data indicator (NDI) can be used in conjunction with HARQ process ID information (e.g., NDI per code word per carrier in MIMO case, NDI per carrier in SIMO case, etc.). The scheme can provide the full flexibility in terms of assigning data on some or all carriers at a certain TTI, with or without code word blanking (for MIMO).

This can reduce overhead with respect of separate HARQ ID per carrier (e.g., 3 bits vs. N×3, where N is the number of carriers). This may be a less flexible operation as compared to the approach where each carrier has separate HARQ ID in terms of scheduling certain retransmissions corresponding to different HARQ processes at the same time. For example if there are pending retransmissions for HARQ process ID 1 for the first carrier, and HARQ process ID 0 and 1 for the second carrier. With separate HARQ process IDs it can be possible to schedule together retransmission for HARQ process ID 1 for the first carrier and retransmission for HARQ process ID 0 for the second carrier. With common HARQ process IDs it can be possible to schedule together new transmission for HARQ process ID 0 for the first carrier and the retransmission for HARQ process ID 0 for the second carrier. Retransmission for HARQ process ID 1 for the first carrier can be delayed. The restriction mostly applies to the corner cases, as in the scheduling process the retransmissions of all UEs are given priority, so it is not very likely that UE would have several pending retransmissions corresponding to different HARQ process IDs.

While LTE-Advanced has to support Rel-8 control it would be beneficial to introduce new aspects that would improve LTE-Advanced functionality by adjusting to the new features introduced in it. This subject innovation addresses the benefits of introducing multicarrier DL and UL assignments. The multicarrier assignments are more suitable for multicarrier configuration as they can provide overhead reduction compared to the single carrier Rel-8 assignments and possibly reduce the UE assignment monitoring to one carrier. The possible multicarrier DCI formats for DL and UL are also provided.

Rel-8 assignment sent on one DL carrier assigns DL/UL resources to the target UE on that same DL carrier/corresponding UL carrier. In addition to Rel-8 assignments, it would be beneficial to introduce multicarrier assignments for LTE-Advanced that would be more suitable for multicarrier configuration and provide overhead reduction compared to the single carrier Rel-8 assignments.

Multicarrier grant would assign resources on multiple carriers. It has smaller overhead since common fields across carriers, such as CRC, HARQ process ID, and flags, are not repeated as in the case of multiple Rel-8 grants used for multicarrier assignment.

The multicarrier assignment could come on any DL carrier and could assign resources for any DL/UL carrier(s). If we configure anchor carriers as described in [1] they would provide reliable control coverage, and the multicarrier assignments should by default come there. The multicarrier assignment sent on anchor carrier would provide reliable data scheduling on carriers on which control may not be reliably conveyed. RRC signalling would inform UE if there are additional DL carrier(s) to monitor for possible multicarrier assignments.

Rel-8 UL grant sent on one DL carrier assigns UL resources to the target UE on the UL paired with that DL carrier. Similarly as in the case of DL assignments, from the perspective of UE assignment monitoring and overhead it would be beneficial to define UL multicarrier grants that would assign UL resources on multiple carriers. Mew DCI formats are required for multicarrier UL assignment. Multicarrier DCI format for UL-SCH assignment is given in Table 1 and is based on Rel-8 Format 0.

TABLE 1

| NRB | 110 | 220 | 330 | 440 | 550 |
|---|---|---|---|---|---|
| Flag format0/format1A differentiation | 1 | 1 | 1 | 1 | 1 |
| Hopping flag | 1 | 1 | 1 | 1 | 1 |
| Resource block assignment and hopping resource allocation | 13 | 15 | 16 | 17 | 18 |
| MCS | 5 | 10 | 15 | 20 | 25 |
| NDI | 1 | 2 | 3 | 4 | 5 |
| TPC | 2 | 2 | 2 | 2 | 2 |
| Cyclic shift for DM RS | 3 | 3 | 3 | 3 | 3 |
| UL index (TDD only) | 0 | 0 | 0 | 0 | 0 |
| Aperiodic CQI request | 1 | 2 | 3 | 4 | 5 |
| ACK/NACK Transmission | 1 | 2 | 3 | 4 | 5 |
| CRC | 16 | 16 | 16 | 16 | 16 |
| Total: | 44 | 54 | 63 | 72 | 81 |

The subject innovation addresses the benefits of introducing multicarrier DL and UL assignments. The multicarrier assignments are more suitable for multicarrier configuration as they can provide overhead reduction compared to the single carrier Rel-8 assignments and possibly reduce the UE assignment monitoring to one (anchor) carrier. The multicarrier assignments are also beneficial as they can be used to schedule data on carriers on which control may not be reliable.

Moreover, although not shown, it is to be appreciated that base station 302 can include memory that retains instructions with respect to identifying a plurality of carriers in frequency and at least one anchor carrier among the plurality of carriers, identifying respective relationships between respective anchor carriers and sets of carriers corresponding to the respective anchor carriers, receiving at least one grant message on one or more anchor carriers, determining a set of assigned resources on respective sets of carriers corresponding to the one or more anchor carriers on which the at least one grant message was received based at least in part on the at least one grant message, and the like. Further, communications apparatus 200 can include a processor that may be utilized in connection with executing instructions (e.g., instructions retained within memory, instructions obtained from a disparate source, . . . ).

Additionally, although not shown, it is to be appreciated that base station 302 can include memory that retains instructions with respect to identifying an employed operating mode, wherein the employed operating mode is selected from the group consisting of a legacy mode and an extended mode, upon identifying the legacy mode, monitoring for control transmissions on resources associated with at least one control region of an anchor carrier within an associated system bandwidth, upon identifying the extended mode, monitoring for control transmissions on resources associated with the at least one control region of the anchor carrier and at least one control region of one or more additional carriers within the associated system bandwidth, and the like. Further, communications apparatus 200 can include a processor that may be utilized in connection with executing instructions (e.g., instructions retained within memory, instructions obtained from a disparate source, . . . ).

Additionally, although not shown, it is to be appreciated that base station 302 can include memory that retains instructions with respect to configuring an anchor carrier at a predetermined frequency range within a system bandwidth to include a control region detectable to respective user equipment units (UEs) operating in a legacy mode and respective UEs operating in an extended mode, configuring at least one additional carrier at respective non-overlapping frequency ranges within the system bandwidth to include respective control regions detectable to UEs operating in the extended mode but transparent to UEs operating in the legacy mode, and the like. Further, communications apparatus 200 can include a processor that may be utilized in connection with executing instructions (e.g., instructions retained within memory, instructions obtained from a disparate source, . . . ).

Figure 4:
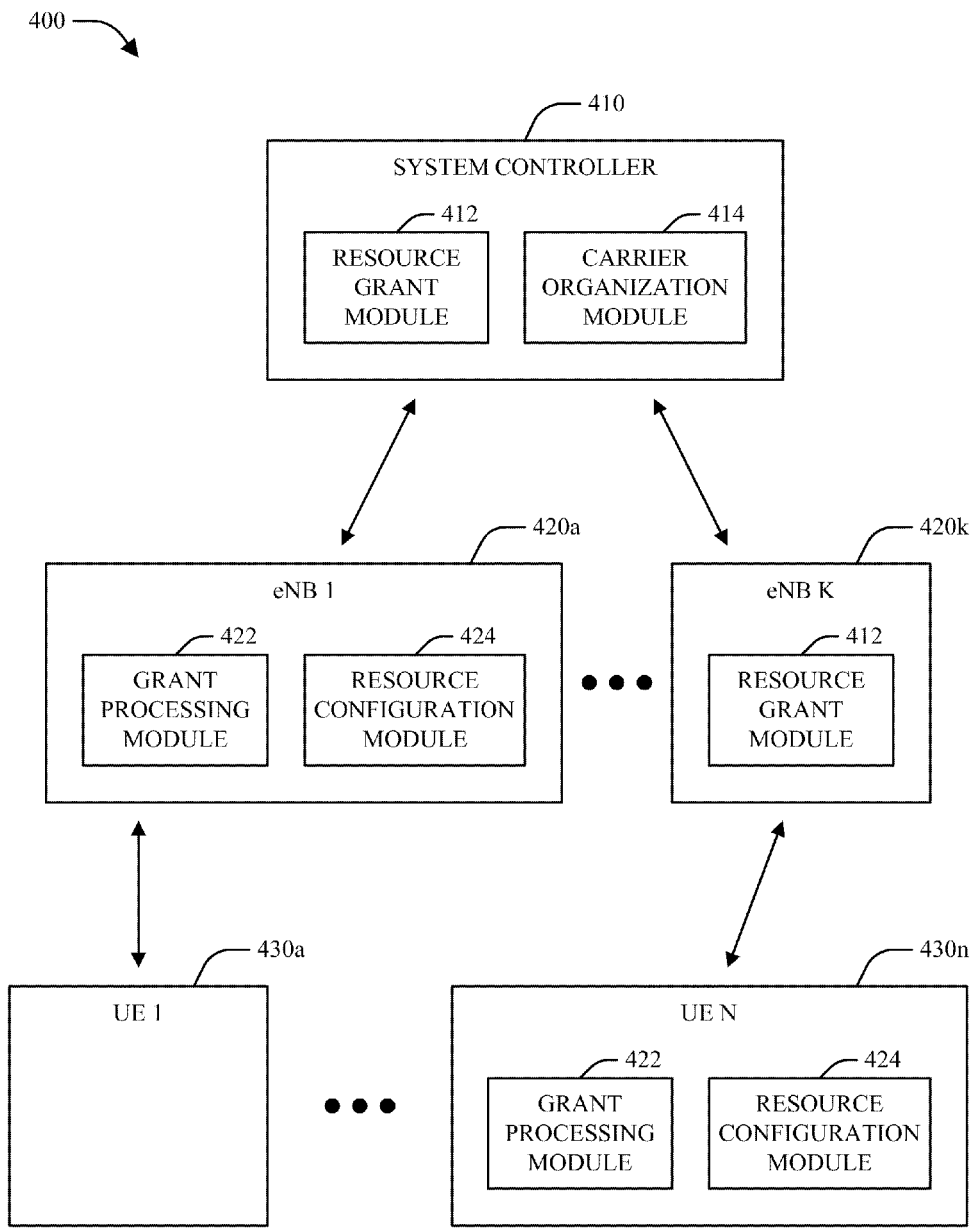
FIG. 4 is an illustration of an example system that facilitates communicating and receiving a grant that specifies resource assignment for two or more carriers.

Now referring to FIG. 4, an example wireless communications system 400 can provide communication and receipt of a grant that specifies resource assignment for two or more carriers. The system 400 can include a system controller 410 that can communicate with any suitable number of eNBs, such as eNB$_1$ 420a to eNB$_K$ 420k, where k is a positive integer. The eNBs can communicate with any suitable number of user equipment (UE), such as UE$_1$ 430a to UE$_N$ 430n, where n is a positive integer.

The system controller 410 can include a resource grant module 412 that can create and communicate a grant message that indicates carrier resource information and/or carrier resource assignment information. For example, the grant message can include resource assignments for a plurality of carriers, wherein the grant message can be communicated via an anchor carrier. The system controller 410 can further include a carrier organization module 414 that can aggregate and/or collect resource information related to the various carriers within a wireless communications environment.

The eNBs can include a grant processing module 422 and/or a resource configuration module 424. It is to be appreciated that the grant processing module 422 and/or the resource configuration module 424 can be included within any suitable eNB (e.g., eNB 420a) and/or any suitable UE (e.g., UE 430a). The grant processing module 422 can receive the message grant via an anchor carrier and determine or ascertain resources for two or more carriers (e.g., anchor carrier and additional carriers). Moreover, the resource configuration module 424 can configure and/or manage resources for each carrier based at least in part upon the received grant message.

Figure 5:
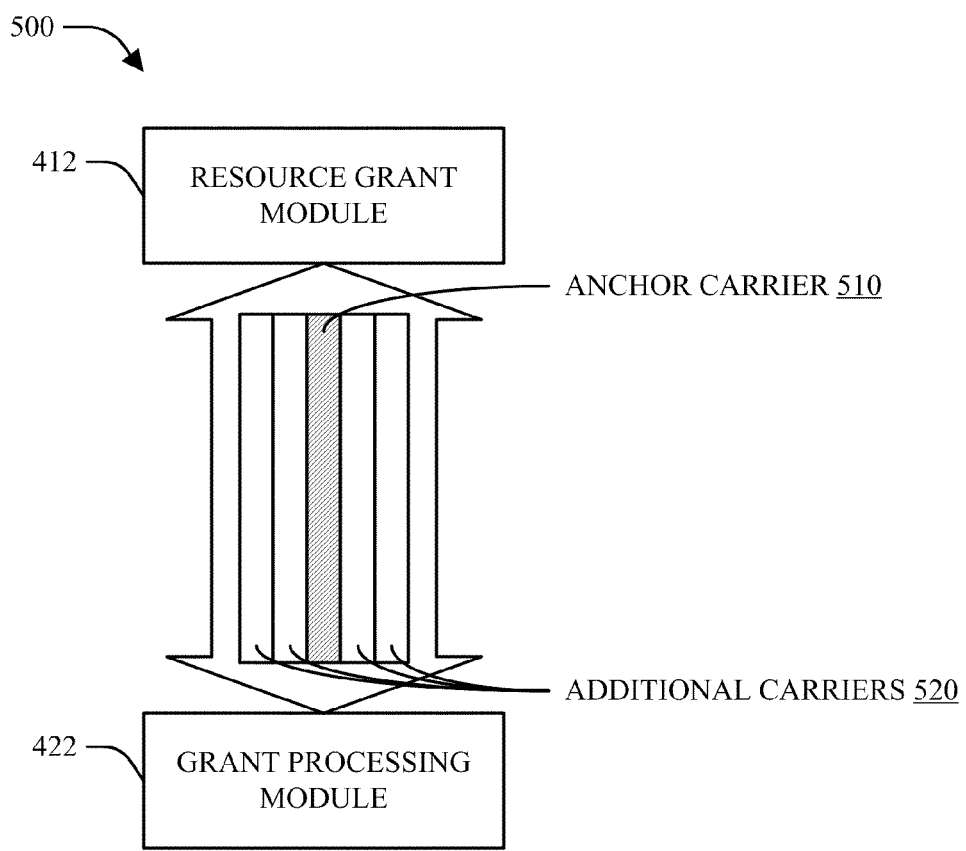
FIG. 5 is an illustration of an example system that facilitates utilizing an anchor carrier to communicate a resource assignment grant for a plurality of carriers.

FIG. 5 is an example system 500 is illustrated that facilitates utilizing an anchor carrier to communicate a resource assignment grant for a plurality of carriers. The system 500 can include the resource grant module 412 and the grant processing module 422. It is to be appreciated that the resource grant module 412 can create and communicate a grant message that includes resource assignment for at least one anchor carrier 510 and at least one additional carrier 520.

Figure 6:
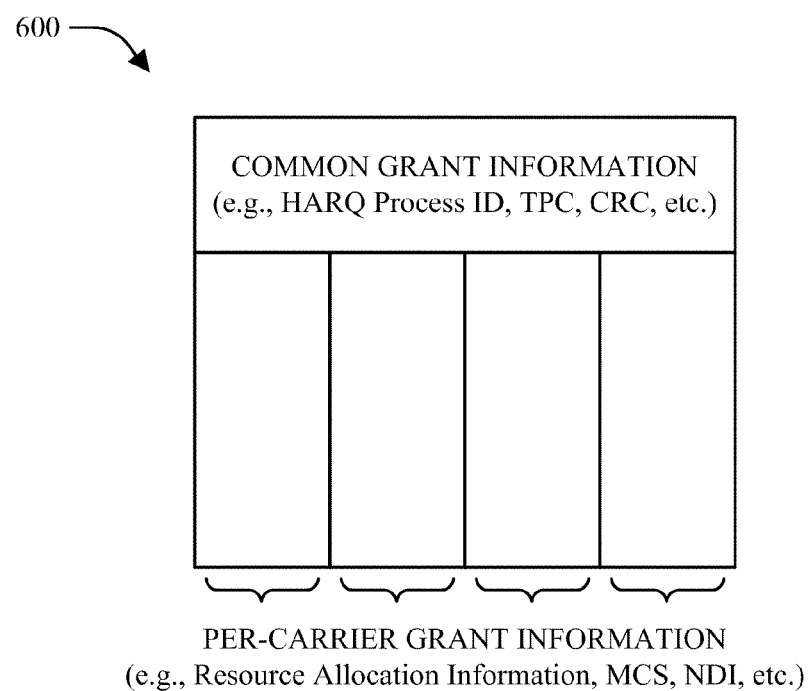
FIG. 6 is an illustration of an example of grant information in accordance with the subject innovation.
Figure 7:
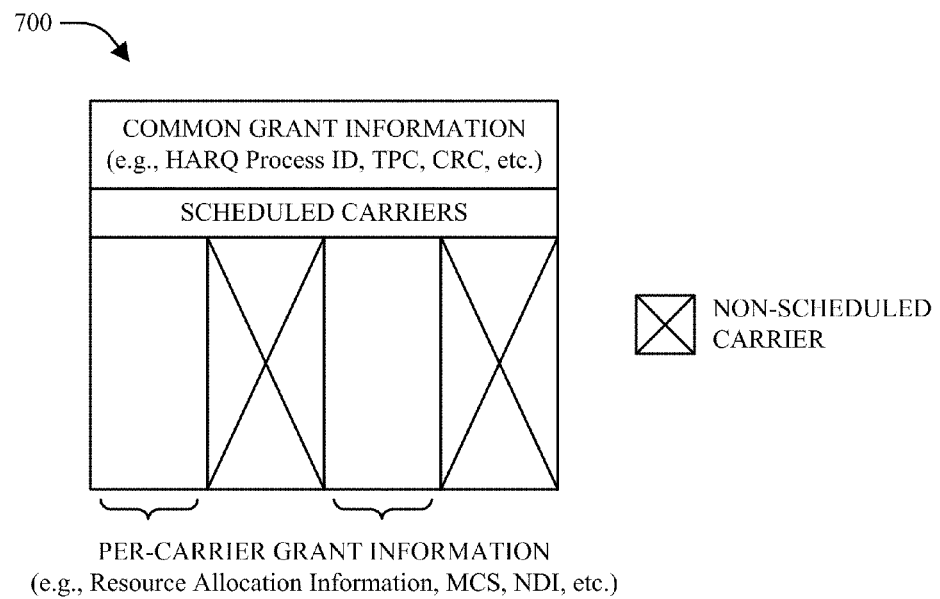
FIG. 7 is an illustration of an example of grant information in accordance with the subject innovation.

Turning briefly to FIG. 6 and FIG. 7, an example of grant information is depicted in accordance with the subject innovation. FIG. 6 illustrates a common grant information 600 (e.g., HARQ Process ID, TPC, CRC, etc.), wherein the common grant information 600 can include per-carrier grant information. For example, the per-carrier grant information can be, but is not limited to, resource allocation information, MCS, NDI, etc. FIG. 7 illustrates a common grant information 700 that provides per-carrier grant information for non-scheduled carriers and scheduled carriers. The common grant information 700 can be HARQ Process ID, TPC, CRC, etc. Moreover, the per-carrier grant information can be, but is not limited to, resource allocation information, MCS, NDI, etc.

Figure 8:
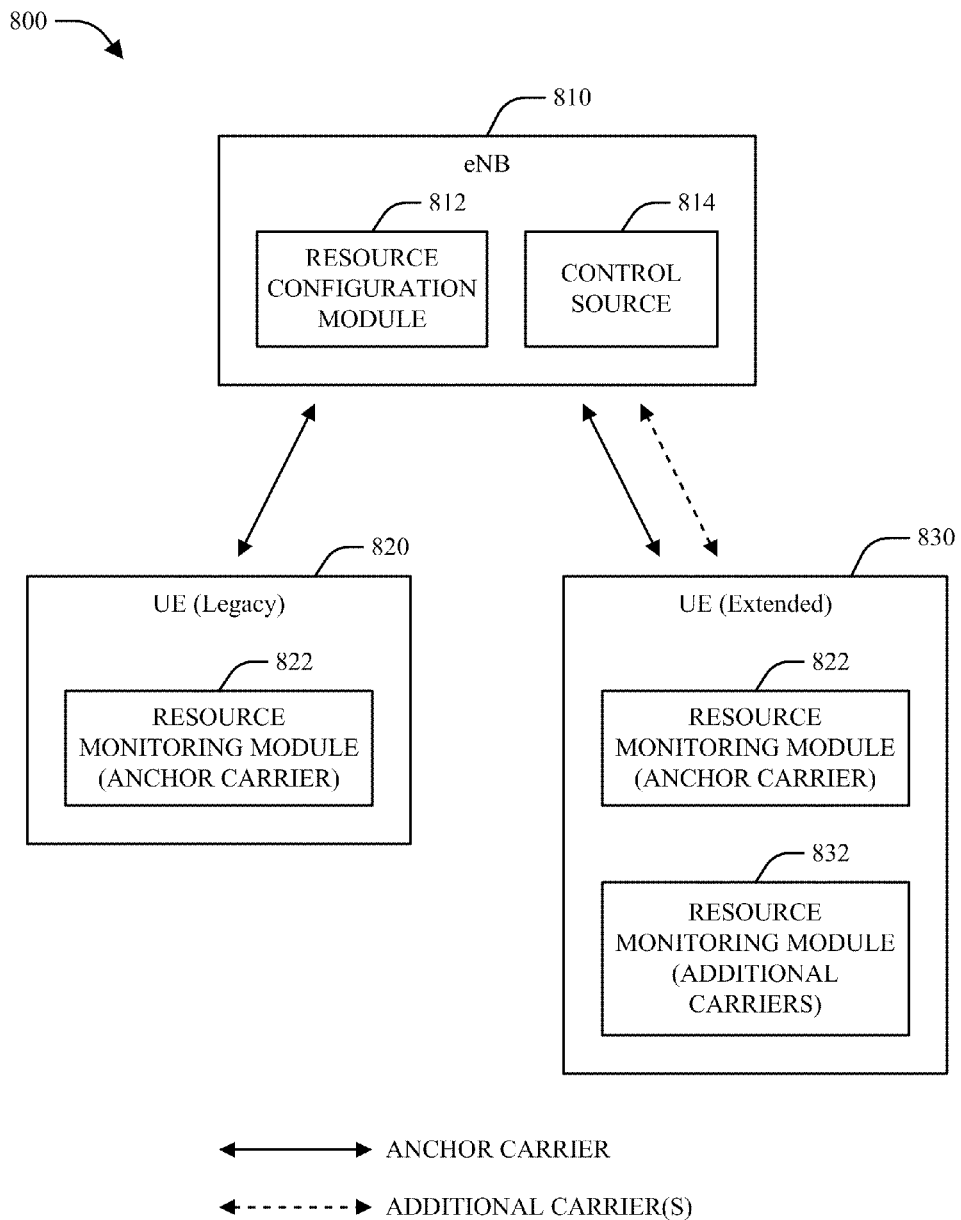
FIG. 8 is an illustration of an example system that facilitates identifying control transmissions based upon an operating mode.

FIG. 8 illustrates an example system 800 that facilitates identifying control transmissions based upon an operating mode. The system 800 can include an eNB 810 that can communicate with a UE (legacy) 820 and/or a UE (extended) 830. The system 800 can enable a UE to monitor for control information based on an identified operating mode. It is to be appreciated that the solid double-sided arrows indicate communications with an anchor carrier and dotted double-sided arrows indicate communications with additional carriers. The eNB 810 can include a resource configuration module 812 and/or a control source 814. The control source 814 can provide control information. The configuration module 812 can configure an anchor carrier and/or an additional carrier at predetermined frequency ranges within bandwidth in order to provide control information to various UEs based upon an operating mode (e.g., legacy, extended, etc.).

The UE (legacy) 820 can include a resource monitoring module (anchor carrier) 822 that can enable the UE to monitor control transmissions on resources associated with at least one control region of an anchor carrier within an associated system bandwidth based on the operating mode being legacy mode. The UE (extended) 830 can include a resource monitoring module (anchor carrier) 822 and a resource monitoring module (additional carriers) 832. The resource monitoring module (anchor carrier) 822 within the UE (extended) 830 can monitor control transmissions on resources associated with at least one control region of the anchor carrier within an associated system bandwidth based on the operating mode being extended mode. The resource monitoring module (additional carriers) 832 within the UE (extended) 830 can monitor control transmissions on resources associated with at least one control region of the additional carrier within an associated system bandwidth based on the operating mode being extended mode. In addition, it is to be appreciated that the UE can determine a respective operating mode in order to determine which control regions to monitor for control information.

Figure 9:
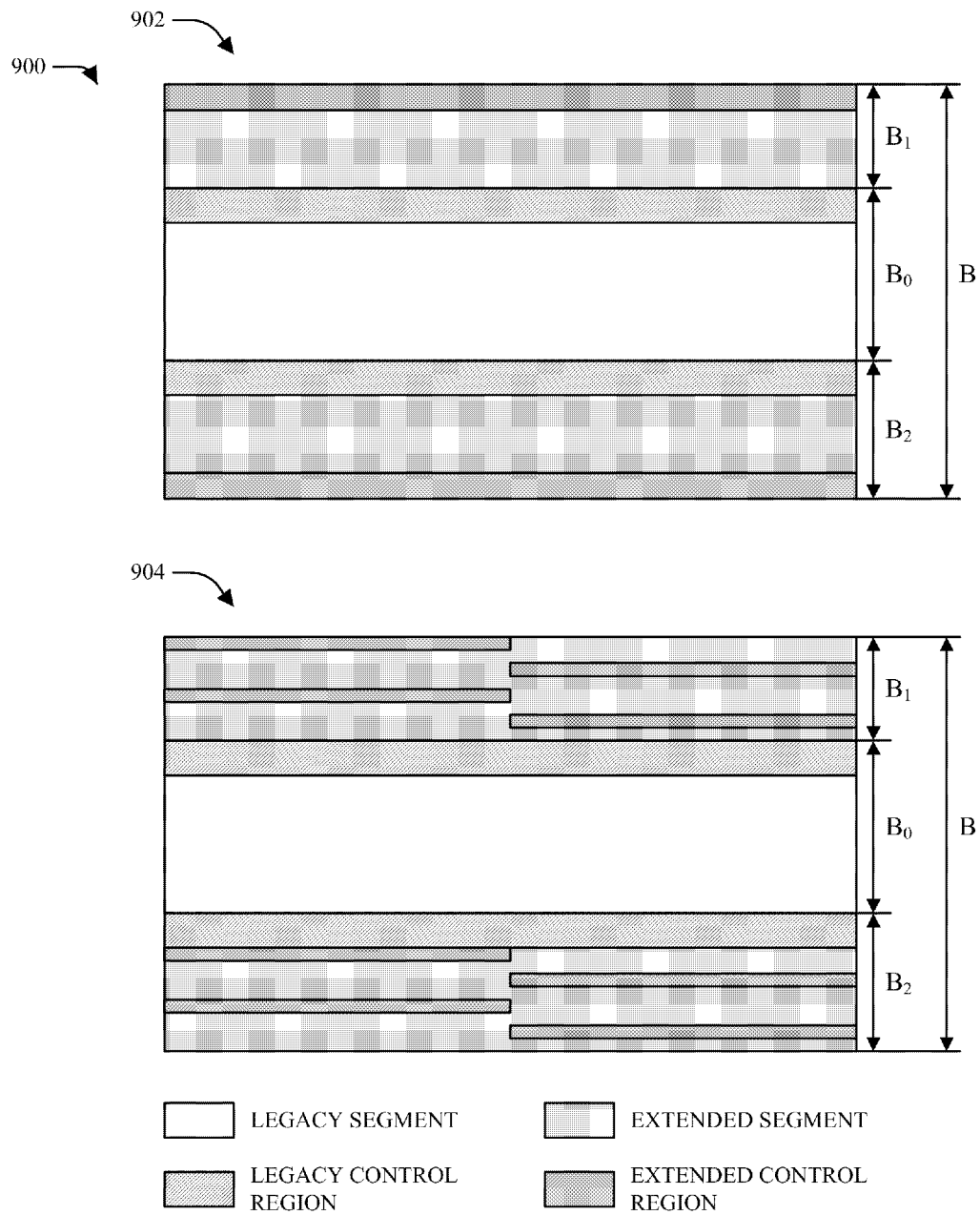
FIG. 9 is an illustration of an example system that facilitates implementing a control region for wireless communications.

FIG. 9 depicts an example system 900 that facilitates implementing a control region for wireless communications. It is to be appreciated that the system 900 is solely an example configuration and is not to be limiting on the subject innovation. The system 900 can include a sample system bandwidth 902 that indicates control information, the bandwidth 902 include B (total bandwidth), B$_1$ (first edge), B$_0$ (section between the first edge and the second edge), and B$_2$ (second edge). The bandwidth 902 illustrates portions of the bandwidth for a legacy segment, a legacy control region, an extended segment, and an extended control region.

The system 900 further includes a bandwidth 904 that indicates control information utilizing frequency hopping. The bandwidth 904 include B (total bandwidth), B$_1$ (first edge), B₀ (section between the first edge and the second edge), and B₂ (second edge). The bandwidth 904 illustrates portions of the bandwidth for a legacy segment, a legacy control region, an extended segment, and an extended control region.

Figure 10:
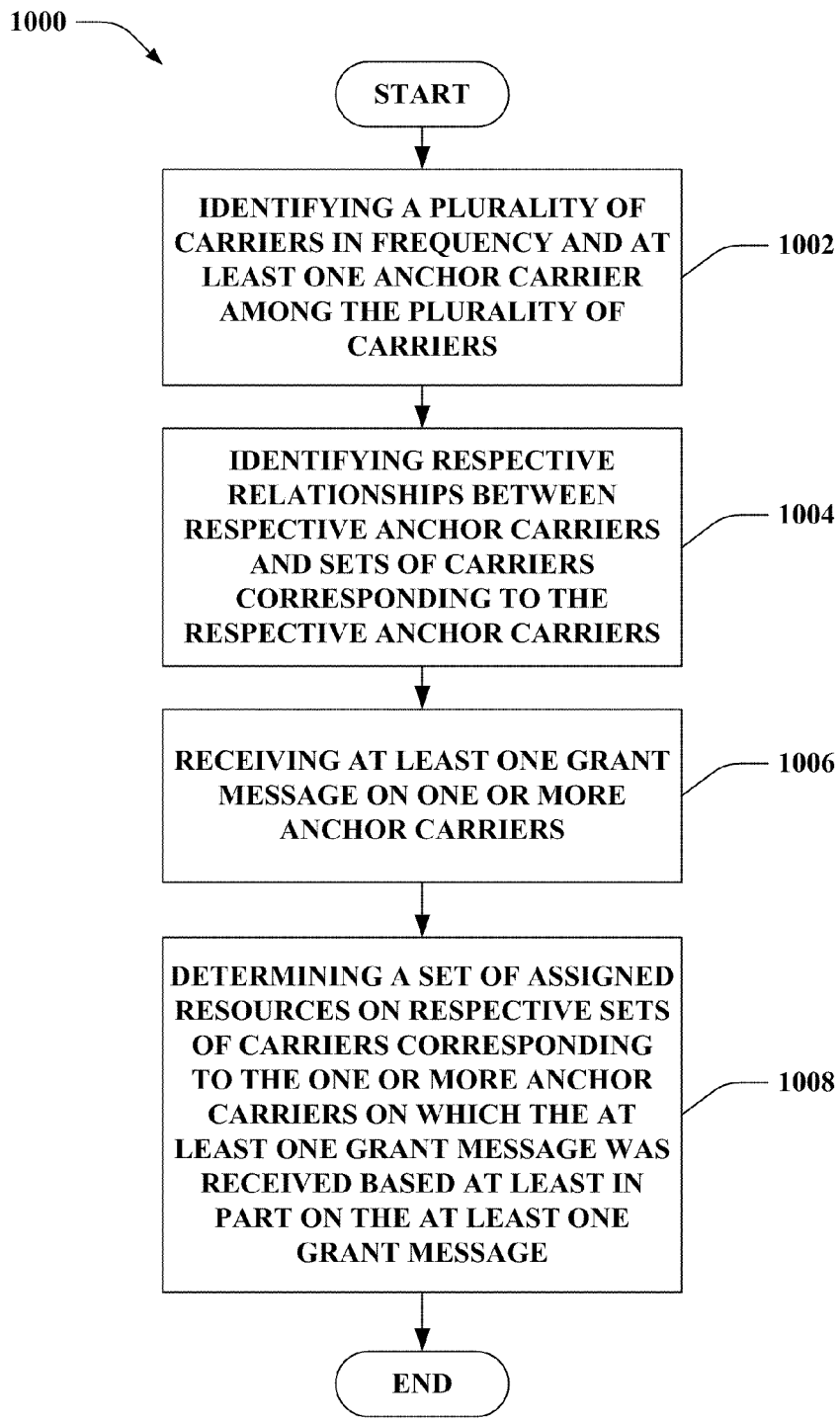
FIG. 10 is an illustration of an example methodology that facilitates assigning resources within a multiple carrier environment.
Figure 11:
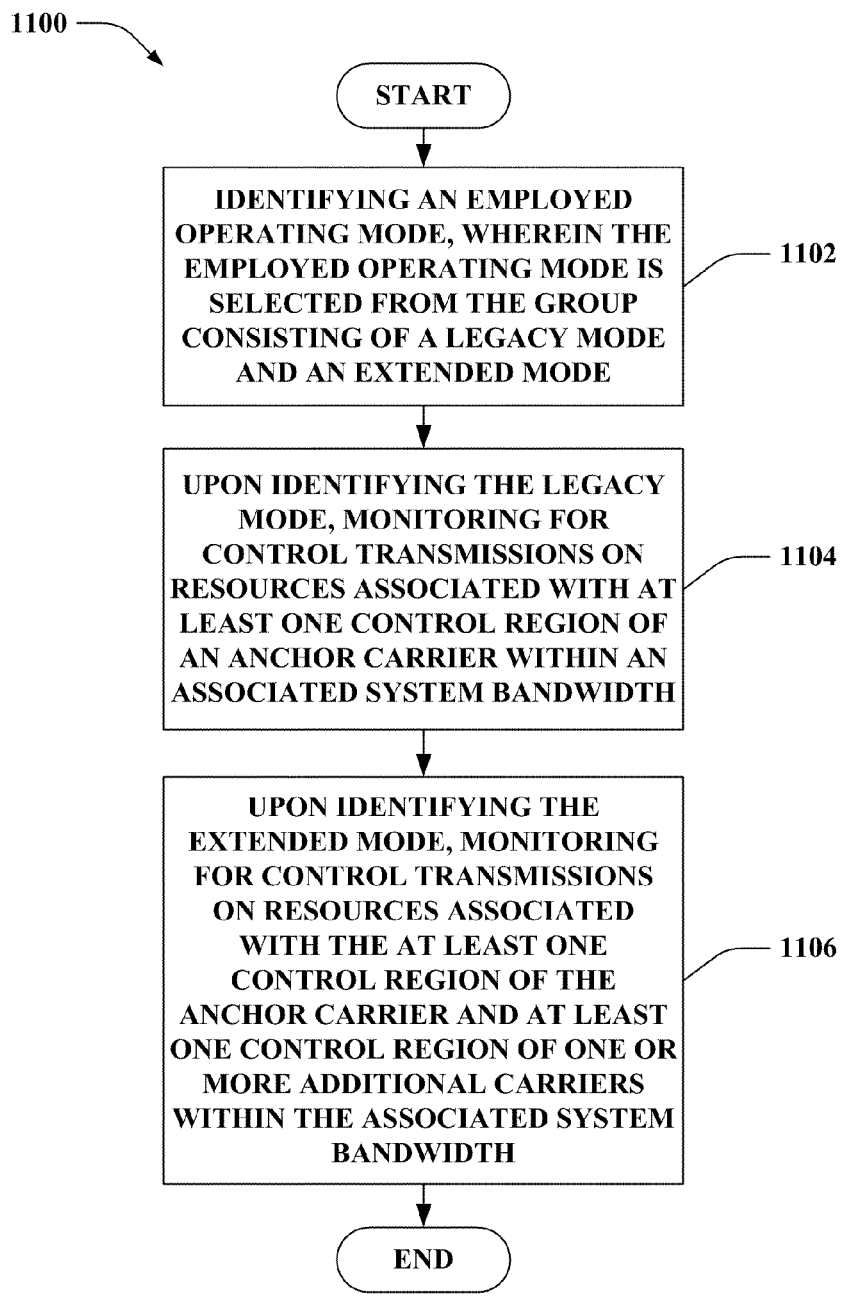
FIG. 11 is an illustration of an example methodology that facilitates identifying control transmissions based upon an operating mode.
Figure 12:
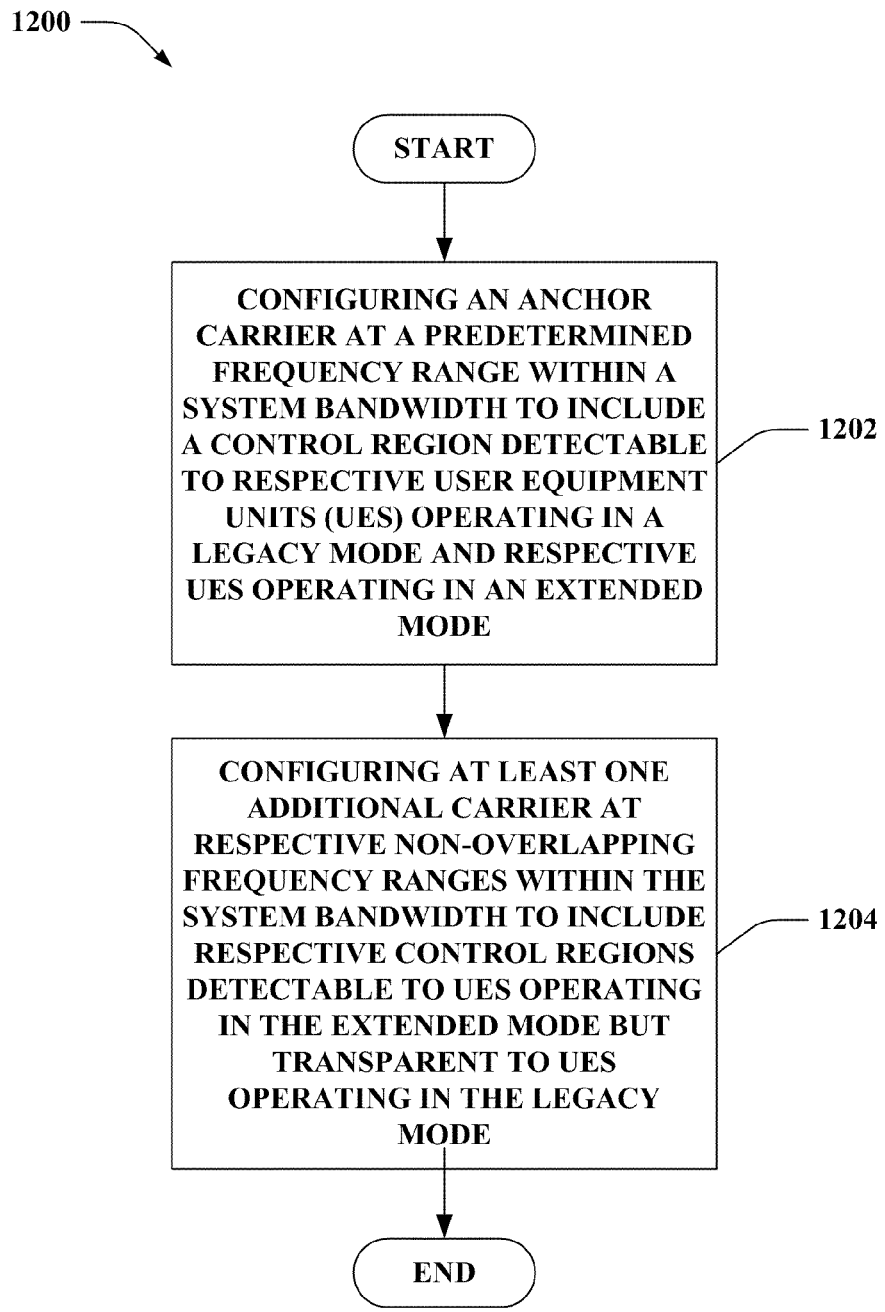
FIG. 12 is an illustration of an example methodology that facilitates communicating control information for two or more carriers to a user equipment (UE).

Referring to FIGS. 10-12, methodologies relating to providing uplink timing control while reducing overhead and power consumption are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 10, illustrated is a methodology 1000 that facilitates assigning resources within a multiple carrier environment. At reference numeral 1002, a plurality of carriers in frequency and at least one anchor carrier among the plurality of carriers can be identified. At reference numeral 1004, respective relationships between respective anchor carriers and sets of carriers corresponding to the respective anchor carriers can be identified. At reference numeral 1006, at least one grant message on one or more anchor carriers can be received. At reference numeral 1008, a set of assigned resources on respective sets of carriers corresponding to the one or more anchor carriers on which the at least one grant message was received based at least in part on the at least one grant message can be determined.

Now referring to FIG. 11, a methodology 1100 is shown that facilitates identifying control transmissions based upon an operating mode. At reference numeral 1102, an employed operating mode can be identified, wherein the employed operating mode is selected from the group consisting of a legacy mode and an extended mode. At reference numeral 1104, upon identifying the legacy mode, control transmissions on resources associated with at least one control region of an anchor carrier within an associated system bandwidth can be monitored. At reference numeral 1106, upon identifying the extended mode, control transmissions on resources associated with the at least one control region of the anchor carrier and at least one control region of one or more additional carriers within the associated system bandwidth can be monitored.

Referring to FIG. 12, a methodology 1200 is illustrates that facilitates communicating control information for two or more carriers to a user equipment (UE). At reference numeral 1202, an anchor carrier at a predetermined frequency range within a system bandwidth can be configured to include a control region detectable to respective user equipment units (UEs) operating in a legacy mode and respective UEs operating in an extended mode. At reference numeral 1204, at least one additional carrier can be configured at respective non-overlapping frequency ranges within the system bandwidth to include respective control regions detectable to UEs operating in the extended mode but transparent to UEs operating in the legacy mode.

Figure 13:
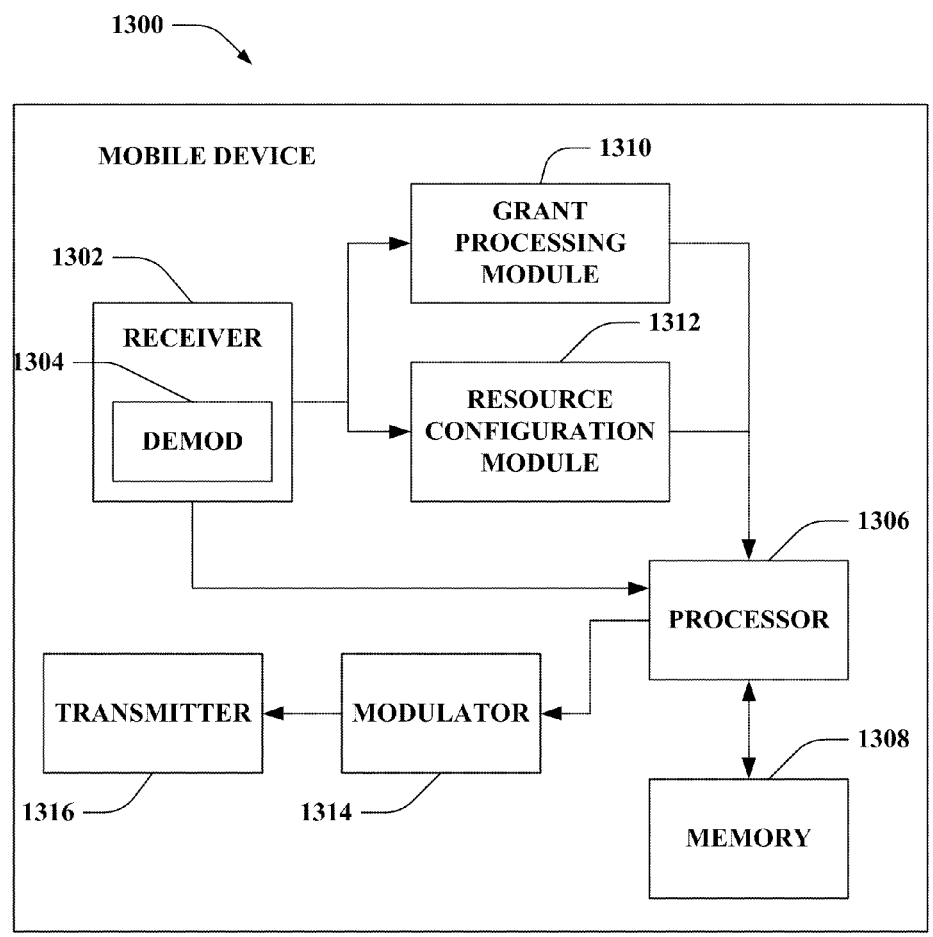
FIG. 13 is an illustration of an example mobile device that facilitates assigning resources for a plurality of carriers in a wireless communication system.

FIG. 13 is an illustration of a mobile device 1300 that facilitates assigning resources for a plurality of carriers in a wireless communication system. Mobile device 1300 comprises a receiver 1302 that receives a signal from, for instance, a receive antenna (not shown), performs typical actions on (e.g., filters, amplifies, downconverts, etc.) the received signal, and digitizes the conditioned signal to obtain samples. Receiver 1302 can comprise a demodulator 1304 that can demodulate received symbols and provide them to a processor 1306 for channel estimation. Processor 1306 can be a processor dedicated to analyzing information received by receiver 1302 and/or generating information for transmission by a transmitter 1316, a processor that controls one or more components of mobile device 1300, and/or a processor that both analyzes information received by receiver 1302, generates information for transmission by transmitter 1316, and controls one or more components of mobile device 1300.

Mobile device 1300 can additionally comprise memory 1308 that is operatively coupled to processor 1306 and that can store data to be transmitted, received data, information related to available channels, data associated with analyzed signal and/or interference strength, information related to an assigned channel, power, rate, or the like, and any other suitable information for estimating a channel and communicating via the channel. Memory 1308 can additionally store protocols and/or algorithms associated with estimating and/or utilizing a channel (e.g., performance based, capacity based, etc.).

It will be appreciated that the data store (e.g., memory 1308) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1308 of the subject systems and methods is intended to comprise, without being limited to, these and any other suitable types of memory.

Processor 1306 can further be operatively coupled to a grant processing module 1310 and/or a resource configuration module 1312. The grant processing module 1310 can receive a grant message from an anchor carrier that includes resource assignment for two or more carriers. The resource configuration module 1312 can manage settings and configurations of resources for the two or more carriers based at least in part upon the received grant message.

Mobile device 1300 still further comprises a modulator 1314 and transmitter 1316 that respectively modulate and transmit signals to, for instance, a base station, another mobile device, etc. Although depicted as being separate from the processor 606, it is to be appreciated that the grant processing module 1310, resource configuration module 1312, demodulator 1304, and/or modulator 1314 can be part of the processor 1306 or multiple processors (not shown).

Figure 14:
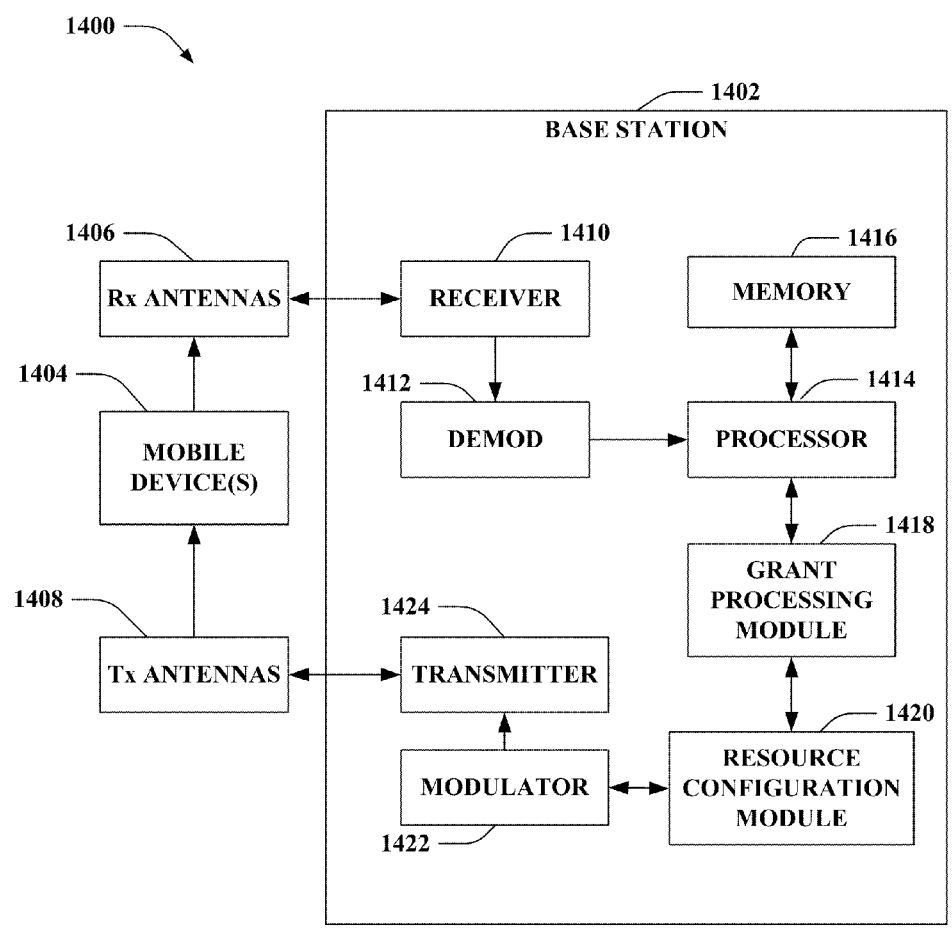
FIG. 14 is an illustration of an example system that facilitates assigning resources for a plurality of carriers in a wireless communication environment.

FIG. 14 is an illustration of a system 1400 that facilitates assigning resources for a plurality of carriers in a wireless communication environment as described supra. The system 1400 comprises a base station 1402 (e.g., access point, with a receiver 1410 that receives signal(s) from one or more mobile devices 1404 through a plurality of receive antennas 1406, and a transmitter 1424 that transmits to the one or more mobile devices 1404 through a transmit antenna 1408. Receiver 1410 can receive information from receive antennas 1406 and is operatively associated with a demodulator 1412 that demodulates received information. Demodulated symbols are analyzed by a processor 1414 that can be similar to the processor described above with regard to FIG. 13, and which is coupled to a memory 1416 that stores information related to estimating a signal (e.g., pilot) strength and/or interference strength, data to be transmitted to or received from mobile device(s) 1404 (or a disparate base station (not shown)), and/or any other suitable information related to performing the various actions and functions set forth herein.

Processor 1414 is further coupled to a grant processing module 1418 that can receive a grant message from an anchor carrier that includes resource assignment for two or more carriers. Moreover, the processor 1414 can be coupled to a resource configuration module 1420 that can manage settings and configurations of resources for the two or more carriers based at least in part upon the received grant message. Furthermore, although depicted as being separate from the processor 1414, it is to be appreciated that the grant processing module 1418, resource configuration module 1420, demodulator 1412, and/or modulator 1422 can be part of the processor 1414 or multiple processors (not shown).

Figure 15:
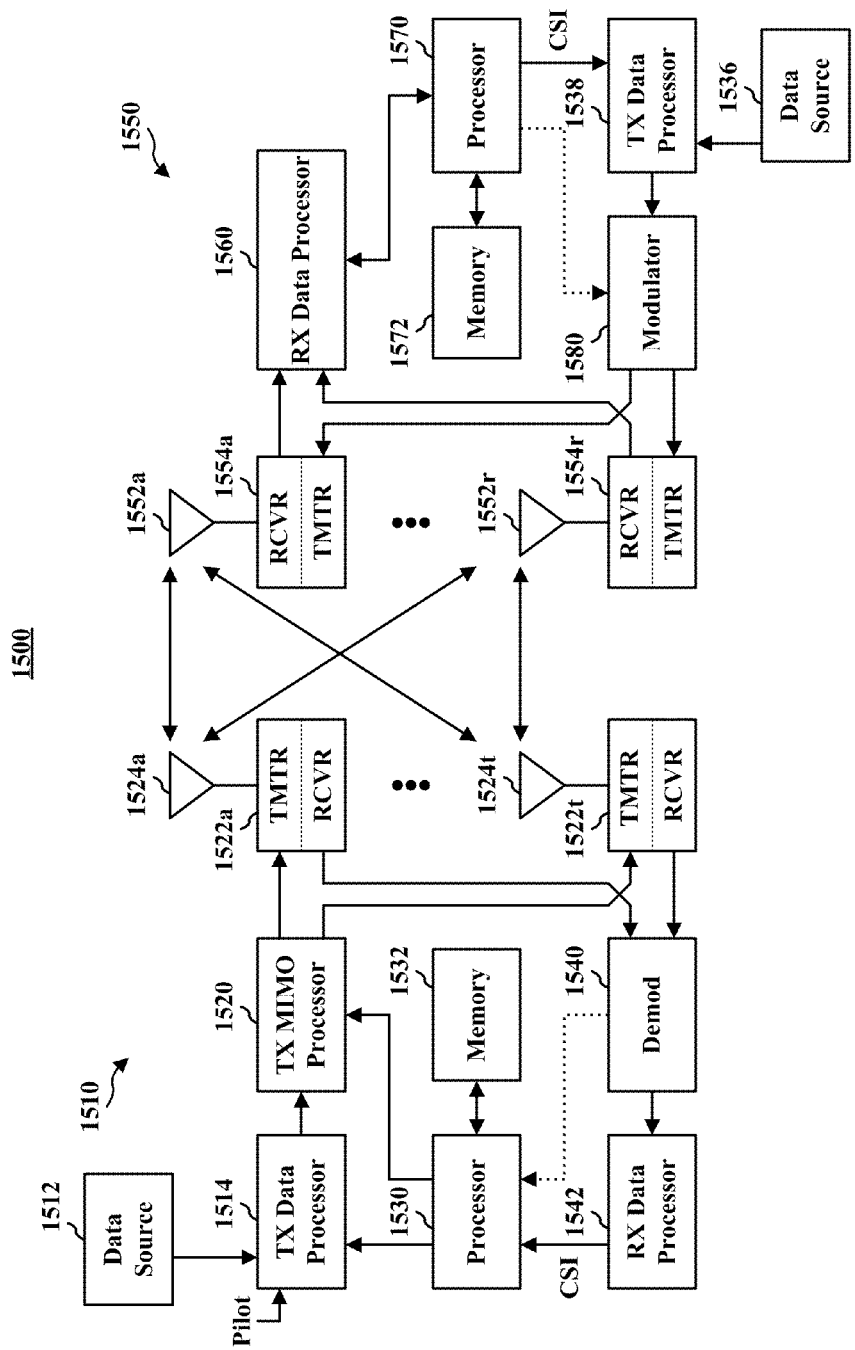
FIG. 15 is an illustration of an example wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. In addition, it is to be appreciated that base station 1510 and/or mobile device 1550 can employ the systems (FIGS. 1-9, 13-14, and 16-18) and/or methods (FIGS. 10-12) described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At mobile device 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which precoding matrix to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 16:
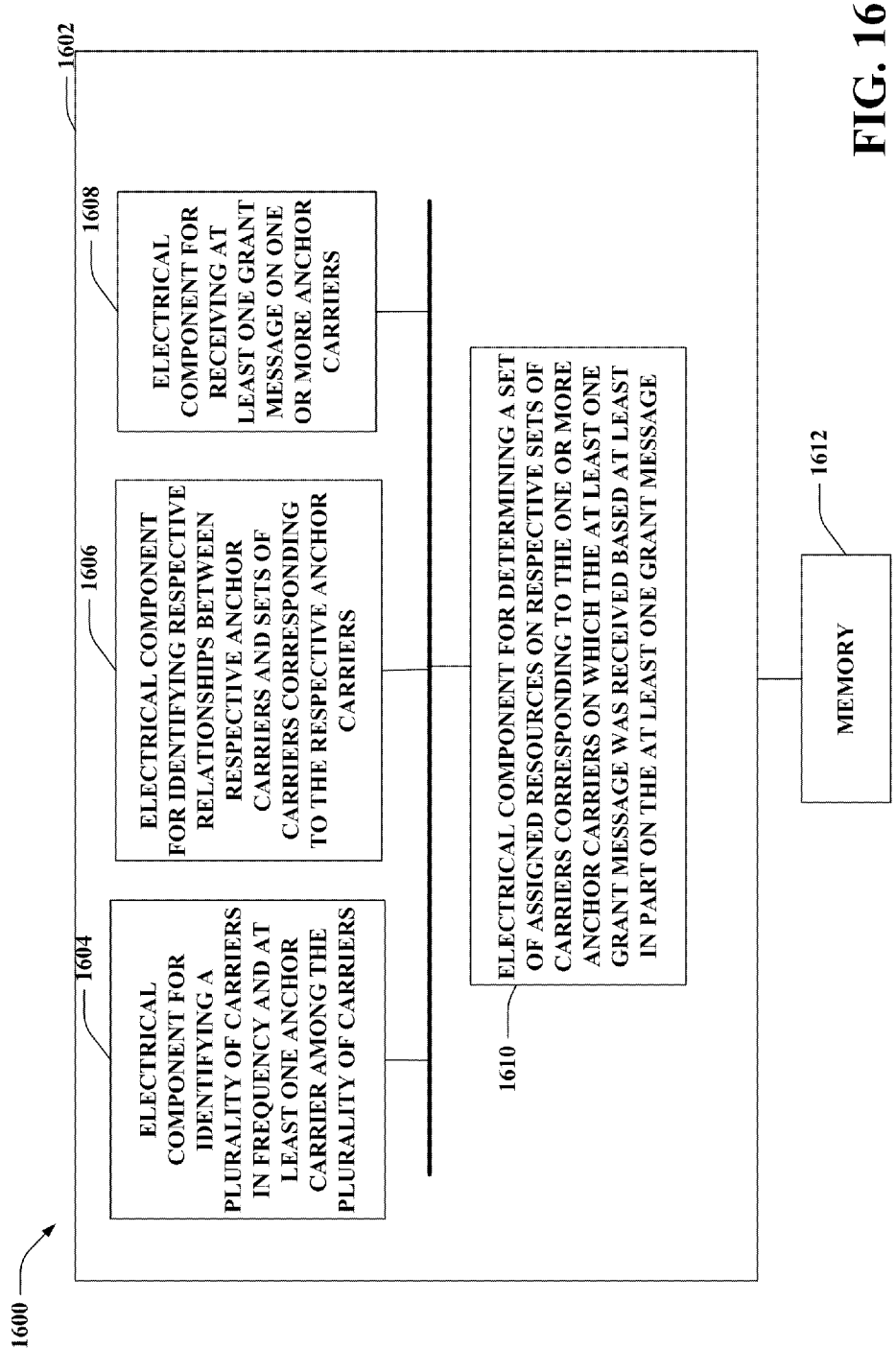
FIG. 16 is an illustration of an example system that facilitates assigning resources within a multiple carrier environment.

With reference to FIG. 16, illustrated is a system 1600 that assigns resources within a multiple carrier environment. For example, system 1600 can reside at least partially within a base station, mobile device, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. The logical grouping 1602 can include an electrical component for identifying a plurality of carriers in frequency and at least one anchor carrier among the plurality of carriers 1604. In addition, the logical grouping 1602 can comprise an electrical component for identifying respective relationships between respective anchor carriers and sets of carriers corresponding to the respective anchor carriers 1606. Moreover, the logical grouping 1602 can include an electrical component for receiving at least one grant message on one or more anchor carriers 1608. The logical grouping 1602 can further include an electrical component for determining a set of assigned resources on respective sets of carriers corresponding to the one or more anchor carriers on which the at least one grant message was received based at least in part on the at least one grant message 1610. Additionally, system 1600 can include a memory 1612 that retains instructions for executing functions associated with electrical components 1604, 1606, 1608, and 1610. While shown as being external to memory 1612, it is to be understood that one or more of electrical components 1604, 1606, 1608, and 1610 can exist within memory 1612.

Figure 17:
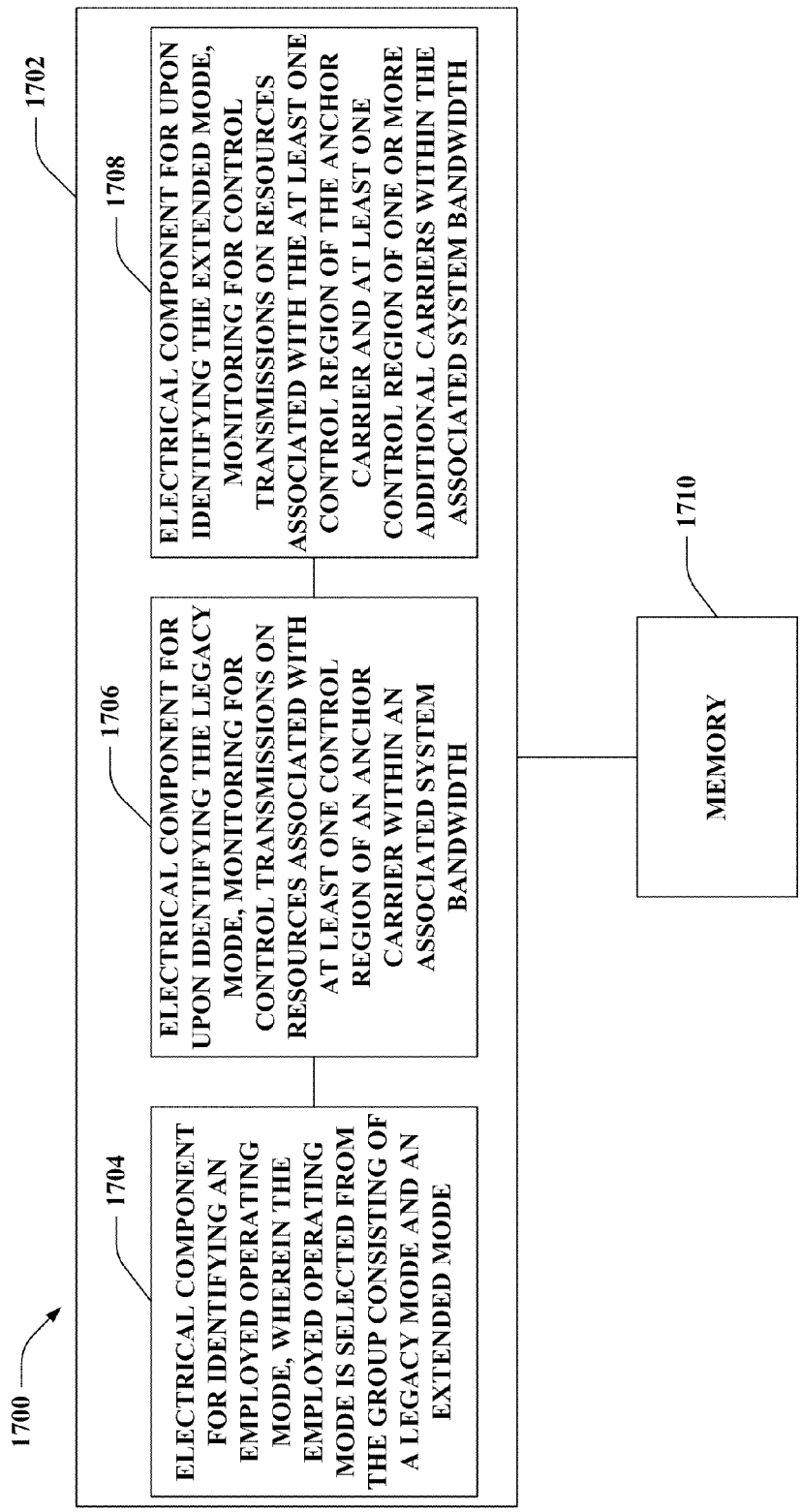
FIG. 17 is an illustration of an example system that identifying control transmissions based upon an operating mode in a wireless communication environment.

Turning to FIG. 17, illustrated is a system 1700 that identifies control transmissions based upon an operating mode in a wireless communication environment. System 1700 can reside within a base station, mobile device, etc., for instance. As depicted, system 1700 includes functional blocks that can represent functions implemented by a processor, software, or combination thereof (e.g., firmware). Logical grouping 1702 can include an electrical component for identifying an employed operating mode, wherein the employed operating mode is selected from the group consisting of a legacy mode and an extended mode 1704. Moreover, logical grouping 1702 can include an electrical component for upon identifying the legacy mode, monitoring for control transmissions on resources associated with at least one control region of an anchor carrier within an associated system bandwidth 1706. Further, logical grouping 1702 can comprise an electrical component for upon identifying the extended mode, monitoring for control transmissions on resources associated with the at least one control region of the anchor carrier and at least one control region of one or more additional carriers within the associated system bandwidth 1708. Additionally, system 1700 can include a memory 1710 that retains instructions for executing functions associated with electrical components 1704, 1706, and 1708. While shown as being external to memory 1710, it is to be understood that electrical components 1704, 1706, and 1708 can exist within memory 1710.

Figure 18:
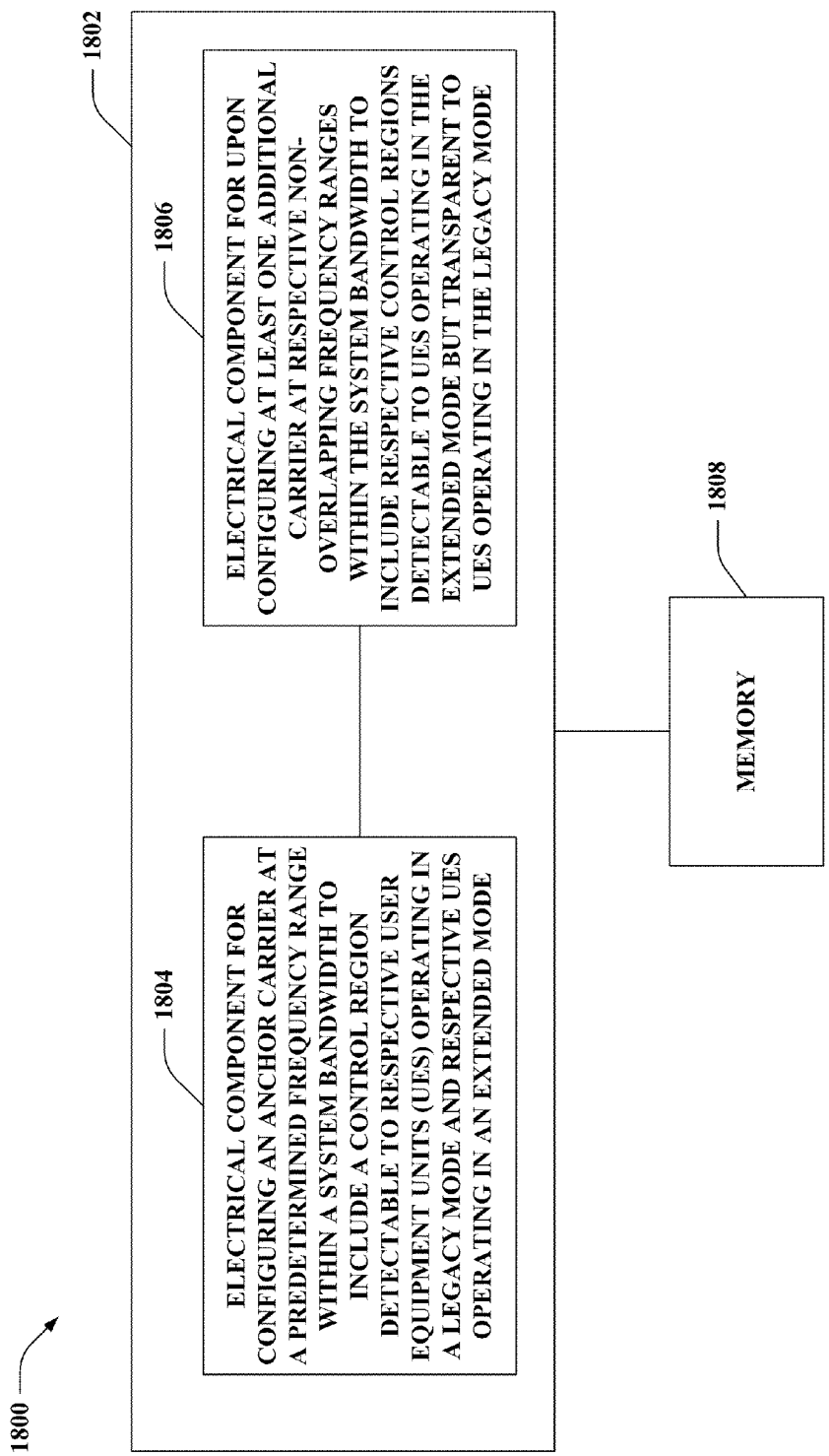
FIG. 18 is an illustration of an example system that communicating control information for two or more carriers to a user equipment (UE) in a wireless communication environment.

Turning to FIG. 18, illustrated is a system 1800 that communicates control information for two or more carriers to a user equipment (UE) in a wireless communication environment. System 1800 can reside within a base station, mobile device, etc., for instance. As depicted, system 1800 includes functional blocks that can represent functions implemented by a processor, software, or combination thereof (e.g., firmware). Logical grouping 1802 can include an electrical component for configuring an anchor carrier at a predetermined frequency range within a system bandwidth to include a control region detectable to respective user equipment units (UEs) operating in a legacy mode and respective UEs operating in an extended mode 1804. Moreover, logical grouping 1802 can include an electrical component for configuring at least one additional carrier at respective non-overlapping frequency ranges within the system bandwidth to include respective control regions detectable to UEs operating in the extended mode but transparent to UEs operating in the legacy mode 1806. Additionally, system 1800 can include a memory 1808 that retains instructions for executing functions associated with electrical components 1804 and 1806. While shown as being external to memory 1808, it is to be understood that electrical components 1804 and 1806 can exist within memory 1808.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by an apparatus used in a wireless communications system that facilitates assigning resources within a multiple carrier environment, comprising:
   identifying a plurality of carriers in frequency and at least one anchor carrier among the plurality of carriers;
   receiving at least one grant message on the at least one anchor carrier; and
   determining a modulation and coding scheme (MCS) and a set of assigned resources comprising a set of resource blocks for the at least one anchor carrier and at least one other carrier among the plurality of carriers based at least in part on the at least one grant message.

2. The method of claim 1, wherein the receiving comprises receiving one or more grant messages that are independently coded to provide information relating to assigned resources on respective individual carriers corresponding to an anchor carrier on which the one or more grant messages were received.

3. The method of claim 1, wherein the receiving comprises receiving a jointly coded grant message that is coded to provide information relating to assigned resources on respective carriers corresponding to an anchor carrier on which the jointly coded grant message was received.

4. The method of claim 3, wherein the determining comprises:
identifying an aggregated resource assignment provided by the jointly coded grant message that comprises concatenated assignment information corresponding to a plurality of carriers; and
determining a set of assigned resources based at least in part on the concatenated assignment information.

5. The method of claim 3, wherein the jointly coded grant message comprises a set of general information that is common across the respective carriers and one or more sets of per-carrier information specific to the respective carriers, wherein the set of general information and the one or more sets of per-carrier information are separately coded and the one or more sets of per-carrier information is at least one of jointly coded across carriers including information assignment for the respective carriers or separately coded for each carrier.

6. The method of claim 5, wherein the set of general information comprises one or more of a Hybrid Automatic Repeat Request (HARQ) process identifier, transmit power control (TPC) information, scheduled carriers identification, or cyclic redundancy check (CRC) information.

7. The method of claim 5, wherein the one or more sets of per-carrier information respectively comprise one or more of resource allocation information, MCS data, transmit power control (TPC) information, or a new data indicator (NDI).

8. The method of claim 7, wherein the respective carriers are associated with a plurality of spatial codewords and the one or more sets of per-carrier information comprise one or more of MCS data or an NDI for the plurality of spatial codewords associated with the respective carriers.

9. The method of claim 5, wherein respective sets of per-carrier information are associated with substantially all carriers in an associated system bandwidth.

10. The method of claim 5, wherein the set of general information comprises information respectively relating to scheduled carriers.

11. The method of claim 10, wherein respective sets of per-carrier information are respectively associated with scheduled carriers.

12. The method of claim 5, further comprising receiving configuration data relating to a subset of carriers within an associated system bandwidth, wherein respective sets of per-carrier information are respectively associated with carriers in the subset of carriers.

13. The method of claim 1, wherein the at least one grant message comprises uplink grant information.

14. The method of claim 1, wherein the at least one grant message comprises downlink grant information.

15. A wireless communications apparatus, comprising:
at least one processor configured to:
identify a plurality of carriers in frequency and at least one anchor carrier among the plurality of carriers;
receive at least one grant message on the at least one anchor carrier;
determine a modulation and coding scheme (MCS) and a set of assigned resources comprising a set of resource blocks for the at least one anchor carrier and at least one other carrier among the plurality of carriers based at least in part on the at least one grant message; and
a memory coupled to the at least one processor.

16. The wireless communications apparatus of claim 15, wherein the at least one grant message comprises uplink grant information.

17. The wireless communications apparatus of claim 15, wherein the at least one grant message comprises downlink grant information.

18. A wireless communications apparatus that assigns resources within a multiple carrier environment, comprising:
means for identifying a plurality of carriers in frequency and at least one anchor carrier among the plurality of carriers;
means for receiving at least one grant message on the at least one anchor carrier; and
means for determining a modulation and coding scheme (MCS) and a set of assigned resources comprising a set of resource blocks for the at least one anchor carrier and at least one other carrier among the plurality of carriers based at least in part on the at least one grant message.

19. The wireless communications apparatus of claim 18, wherein the means for receiving is configured to receive one or more grant messages that are independently coded to provide information relating to assigned resources on respective individual carriers corresponding to an anchor carrier on which the one or more grant messages were received.

20. The wireless communications apparatus of claim 18, wherein the means for receiving is configured to receive a jointly coded grant message that is coded to provide information relating to assigned resources on respective carriers corresponding to an anchor carrier on which the jointly coded grant message was received.

21. The wireless communications apparatus of claim 20, wherein the means for determining is configured to:
identify an aggregated resource assignment provided by the jointly coded grant message that comprises concatenated assignment information corresponding to a plurality of carriers; and
determine a set of assigned resources based at least in part on the concatenated assignment information.

22. The wireless communications apparatus of claim 20, wherein the jointly coded grant message comprises a set of general information that is common across the respective carriers and one or more sets of per-carrier information specific to the respective carriers, wherein the set of general information and the one or more sets of per-carrier information are separately coded and the one or more sets of per-carrier information is at least one of jointly coded across carriers including information assignment for the respective carriers or separately coded for each carrier.

23. The wireless communications apparatus of claim 22, wherein the set of general information comprises one or more of a Hybrid Automatic Repeat Request (HARQ) process identifier, transmit power control (TPC) information, scheduled carriers identification, or cyclic redundancy check (CRC) information.

24. The wireless communications apparatus of claim 22, wherein the one or more sets of per-carrier information respectively comprise one or more of resource allocation information, MCS data, transmit power control (TPC) information, or a new data indicator (NDI).

25. The wireless communications apparatus of claim 24, wherein the respective carriers are associated with a plurality of spatial codewords and the one or more sets of per-carrier information comprise one or more of MCS data or an NDI for the plurality of spatial codewords associated with the respective carriers.

26. The wireless communications apparatus of claim 22, wherein respective sets of per-carrier information are associated with substantially all carriers in an associated system bandwidth.

27. The wireless communications apparatus of claim 22, wherein the set of general information comprises information respectively relating to scheduled carriers.

28. The wireless communications apparatus of claim 27, wherein respective sets of per-carrier information are respectively associated with scheduled carriers.

29. The wireless communications apparatus of claim 22, further comprising means for receiving configuration data relating to a subset of carriers within an associated system bandwidth, wherein respective sets of per-carrier information are respectively associated with carriers in the subset of carriers.

30. The wireless communications apparatus of claim 18, wherein the at least one grant message comprises uplink grant information.

31. The wireless communications apparatus of claim 18, wherein the at least one grant message comprises downlink grant information.

32. A computer program product, comprising:
a non-transitory computer-readable medium comprising:
code for causing at least one computer to identify a plurality of carriers in frequency and at least one anchor carrier among the plurality of carriers;
code for causing at least one computer to receive at least one grant message on the at least one anchor carrier; and
code for causing at least one computer to determine a modulation and coding scheme (MCS) and a set of assigned resources comprising a set of resource blocks for the at least one anchor carrier and at least one other carrier among the plurality of carriers based at least in part on the at least one grant message.

* * * * *